(12) United States Patent
Oh et al.

(10) Patent No.: US 6,992,179 B1
(45) Date of Patent: Jan. 31, 2006

(54) REACTIVE ORANGE DYES CONTAINING VINYL SULFONES

(75) Inventors: Sea Wha Oh, Daejeon (KR); Myeong Nyeo Kang, Daejeon (KR); Tae Kyung Kim, Daejeon (KR)

(73) Assignee: Korea Research Institute of Chemical Technology, Daejeon (KR)

( * ) Notice: Subject to any disclaimer, the term of this patent is extended or adjusted under 35 U.S.C. 154(b) by 0 days.

(21) Appl. No.: 09/646,937

(22) PCT Filed: Mar. 26, 1999

(86) PCT No.: PCT/KR99/00142

§ 371 (c)(1),
(2), (4) Date: Nov. 20, 2000

(87) PCT Pub. No.: WO99/48985

PCT Pub. Date: Sep. 30, 1999

(30) Foreign Application Priority Data

Mar. 26, 1998 (KR) .................................. 98-10607

(51) Int. Cl.
*C09B 62/51* (2006.01)
(52) U.S. Cl. ........................ 534/582; 534/642
(58) Field of Classification Search ............... 534/582, 534/642
See application file for complete search history.

(56) References Cited

U.S. PATENT DOCUMENTS

| 4,080,322 A | | 3/1978 | Mislin et al. |
| 5,011,917 A | * | 4/1991 | Opitz et al. .................. 534/583 |
| 6,443,997 B1 | * | 9/2002 | Oh et al. ........................ 8/549 |

FOREIGN PATENT DOCUMENTS

GB 1 289 159 9/1972

* cited by examiner

*Primary Examiner*—Fiona T. Powers
(74) *Attorney, Agent, or Firm*—Finnegan, Henderson, Farabow, Garrett & Dunner, LLP

(57) ABSTRACT

The present invention relates to a reactive orange dye containing vinyl sulfone and more particularly, to the dye which have 6(7)-alkoxycarbonylamino-4-hydroxy-2-naphthalenesulfonic acid as a chromophore and aminophenyl-β-ethylsulfone derivative as an azo coupler. This dye provides excellent fastness in terms of light, washing, perspiration and chlorine as well as better dyeing yield than other monofunctional reactive dye. In Formula (1), M is alkaline metal atom; Z is —O—$SO_3$M or OC(O)$CH_3$; R is alkyl group having 1–4 of carbon atom; and a position of $C_6$ or $C_7$ is substituted with carbamate group.

2 Claims, No Drawings

REACTIVE ORANGE DYES CONTAINING VINYL SULFONES

BACKGROUND OF THE INVENTION

1. Field of the Invention

The present invention relates to a reactive orange dye containing vinyl sulfone and more particularly, to the dye which have 6(7)-alkoxycarbonylamino-4-hydroxy-2-naphthalenesulfonic acid as a chromophore and aminophenyl-β-ethylsulfone derivative as an azo coupler. This dye provides excellent fastness in terms of light, washing, perspiration and chlorine as well as better dyeing yield than other monofunctional reactive dye:

Formula 1

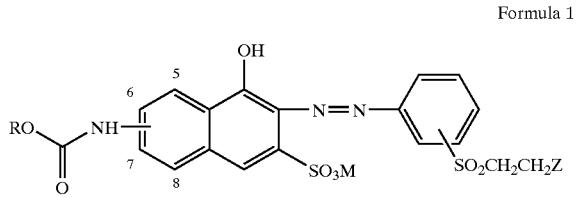

wherein, M is alkaline metal atom; Z is —O—SO$_3$M or OC(O)CH$_3$; R is alkyl group having 1–4 of carbon atom; and a position of C$_6$ or C$_7$ is substituted with carbamate group.

2. Description of the Related Art

In the case of using the conventional orange reactive dye containing a vinylsulfone-based compound for the manufacture of a black dye, a much larger amount of dye is needed in mixing for preparation of black dye. This is because the conventional orange reactive dye has lower several fastness, particularly, light fastness, and lower dyeing yield and the amount of wastefulness during washing is larger, which is responsible for the waste of dye, change of color and the difficulty of adjusting tone.

SUMMARY OF THE INVENTION

In an effort to solve the problems of conventional reactive orange dye containing vinyl sulfone, the inventors have made intensive studies and as a result they have developed the dye expressed in formula 1.

Accordingly, an object of this invention is to provide a reactive orange dye containing vinyl sulfone which has an excellent combination of properties such as better fastness in light, washing, perspiration and chlorine, superior dyeing yield compared to other monofunctional reactive dyes, and better effectiveness on dyeing of cellulose fibers for mixing color as well as single color.

DETAILED DESCRIPTION OF THE INVENTION

This invention is characterized by a reactive orange dye containing vinyl sulfone expressed in the following formula 1:

Formula 1

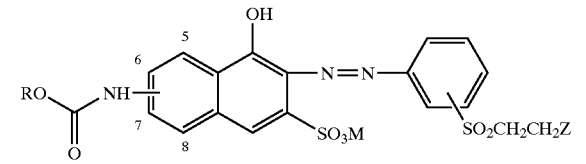

wherein, M is alkaline metal atom; Z is —O—SO$_3$M or OC(O)CH$_3$; R is alkyl group having 1–4 of carbon atom; and a position of C$_6$ or C$_7$ is substituted with carbamate group.

This invention is also characterized by a process for preparing a reactive orange dye containing vinyl sulfone expressed in the following formula 1, which comprises the steps of:

(a) diazotizing aminophenyl-β-ethylsulfone compound of formula 2;

(b) condensing in such a manner that alkyl chloroformate is slowly added to neutralized solution of 6(7)-amino-4-hydroxy-2-naphthalenesulfonic acid to prepare 6(7)-alkoxycarbonylamino-4-hydroxy-2-naphthalene-sulfonic acid expressed in the following formula (3) at 0–25° C. with maintaining pH in the range of 3–6 by means of LiOH or Li$_2$CO$_3$; and (c) coupling the reacting mixtures obtained in the above steps of (a) and (b) at 0–5° C. with adding a base so as to adjust pH lower than 6.5.

The process for preparing the reactive orange dye containing vinyl sulfone is expressed as the following Scheme 1:

Scheme 1

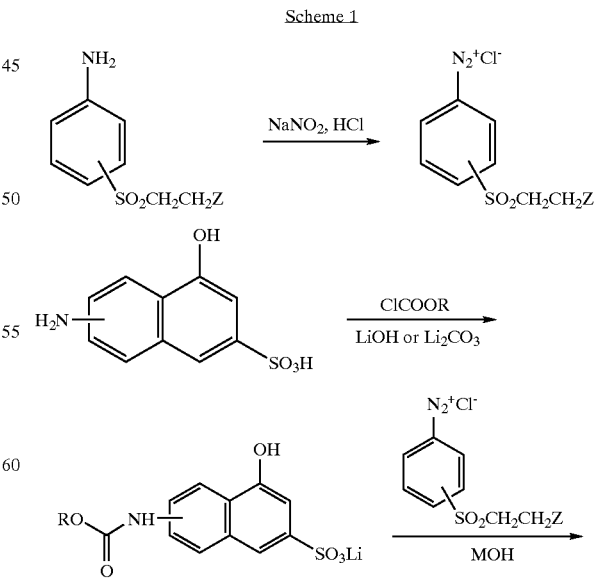

-continued

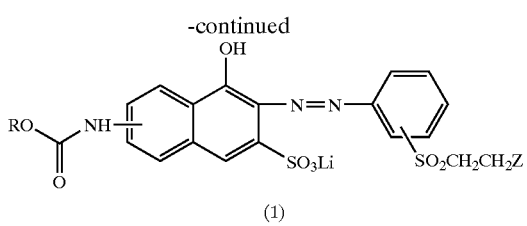

(1)

wherein M is an alkaline metal atom; Z is —$OSO_3M$ or $OC(O)CH_3$; and R is alkyl group having 1–4 of carbon atom.

The first step is to diazonate 3(4)-aminophenyl-β-ethylsulfone. The diazotization is a commonly available method; 3(4)-aminophenyl-β-ethylsulfone is dispersed in water at 0–5° C., followed by the addition of concentrated hydrochloric acid and $NaNO_2$ to carry out diazotization reaction.

The second step is to generate a sulfonic acid lithium salt by neutralizing 6(7)-alkoxycarbonylamino-4-hydroxy-2-naphthalenesulfonic acid with a base, preferably LiOH or $Li_2CO_3$. The amount of lithium base is determined by equivalent rate to the amount of 6(7)-amino-4-hydroxy-2-naphthalenesulfonic acid.

Then, with adjusting pH in the range of 3–6 by LiOH or $Li_2CO_3$, alkyl chloroformate is slowly added to the neutralized aqueous solution of 6(7)-alkoxycarbonylamino-4-hydroxy-2-naphthalenesulfonic acid lithium salt. In this reaction, it is necessary to use lithium base instead of NaOH, $Na_2CO_3$, KOH or $K_2CO_3$ which reacts with alkyl chloroformate to generate by-products. As a result of the above reaction, amine group of 6(7)-alkoxycarbonylamino-4-hydroxy-2-naphthalenesulfonic acid and alkyl chloroformate are condensed to give a 6(7)-alkoxycarbonylamino-4-hydroxy-2-naphthalenesulfonic acid expressed by following formula 3. An alkyl group of alkyl chloroformate is methyl, ethyl, n-propyl or n-butyl group. If the pH of condensation reacting solution is lower than 3, alkyl chloroformate becomes hydrolyzed; in the case of exceeding pH 6, it condensed with hydroxy group. Further, it is preferred that the condensation temperature is 0–25° C. with addition of ice, more preferably 10–15° C. If the temperature is lower than 0° C., the reaction rate is extremely slow; in the case of exceeding 25° C., the side reaction may occur.

The last step is to couple the diazo solution and condensing reaction mixture at 0–5° C. with adding a base so as to adjust pH in the range of 5–6.5, finally preparing reactive orange dye containing vinyl sulfone expressed in the formula 1. If the pH is more than 6.5, reactive groups may be hydrolyzed.

The following specific examples are intended to be illustrative of the invention and should not be construed as limiting the scope of the invention as defined by appended claims.

EXAMPLE 1

First, 8.44 g(0.03 mol) of 4-aminophenyl-β-sulfatoethylsulfone was dispersed in 70 ml of water and after the dropping of $NaNO_2$ (10.5 ml), the temperature was adjusted to 0–5° C., followed by the addition of ice (100 g). Then, 6.52 ml of 35% HCl was added to diazonate and excess of nitrous acid was removed with the addition of sulfamic acid.

60 ml of $H_2O$ was added to 7.18 g (0.03 mol) of 6-amino-4-hydroxy-2-naphthalene sulfonic acid and was then neutralized with 15 ml of aqueous solution of 2N LiOH, after which pH was adjusted to 5.5–6.0 with 2N HCl, followed by the addition of 30 g of ice. Thereafter, 3.58 g (0.033 mol) of ethyl chloroformate was slowly added to the reaction mixture in the presence of aqueous solution of LiOH for adjusting pH to be 3–6, which leads to condensation reaction. After the completion of the above reaction, salting-out and filtering was carried out following the adjustment of pH to 6.

Thereafter, the condensed solid of ethyl chloroformate is dissolved in 60 ml of water and diazo solution was added for the purpose of coupling reaction at 0–5° C. with adjustment of pH to 5.0–6.5 by aqueous solution of $Na_2CO_3$. Following the completion of coupling reaction, spray-drying was performed and finally reactive orange dye containing vinyl sulfone (R=$C_2H_5$, Z=$OSO_3Na$) expressed in the formula (1) was prepared.

$^1$H-NMR(300 MHz, DMSO-$d_6$): δ 1.26(3H, t), 3.63(2H, t), 3.96(2H, t), 4.16(2H, q), 7.49(1H, s), 7.66(1H, d), 7.80 (1H, d), 7.90(2H, d), 7.96(2H, d), 8.41(1H, s), 10.06(1H, s), 15.50(1H, s)

EXAMPLE 2

First, 7.30 g(0.03 mol) of 4-aminophenyl-β-acetoxyethylsulfone was dispersed in 70 ml of water and after the dropping of $NaNO_2$ (10.5 ml), the temperature was adjusted to 0–5° C., followed by the addition of ice (100 g). Then, 6.52 ml of 35% HCl was added to diazonate and excess of nitrous acid was removed with the addition of sulfamic acid.

60 ml of $H_2O$ was added to 7.18 g (0.03 mol) of 6-amino-4-hydroxy-2-naphthalene sulfonic acid and was then neutralized with 15 ml of aqueous solution of 2N LiOH, after which pH was adjusted to 5.5–6.0 with 2N HCl, followed by the addition of 30 g of ice. Thereafter, 3.58 g (0.033 mol) of ethyl chloroformate was slowly added to the reaction mixture in the presence of aqueous solution of LiOH for adjusting pH to be 3–6, which leads to condensation reaction.

Thereafter, the diazo solution was added to the condensed solution of ethyl chloroformate and upon adjusting pH to be 5–6.5 with aqueous solution of $Na_2CO_3$, the coupling reaction was completed at 0–5° C. Finally, the resulting mixture was salting-outed and prepared reactive orange dye containing vinyl sulfone (R=$C_2H_5$, Z=$OCOCH_3$) expressed in the formula (1) was prepared.

$^1$H-NMR(300 MHz, DMSO-$d_6$): δ 1.26(3H, t), 1.77(3H, s), 3.72(2H, t), 4.16(2H, q), 4.26(2H, t), 7.49(1H, s), 7.66 (1H, d), 7.79(1H, d), 7.90(2H, d), 7.97(2H, d), 8.41(1H, s), 10.05(1H, s), 15.48(1H, s)

EXAMPLE 3

First, 59.07 g(0.21 mol) of 4-aminophenyl-β-sulfatoethylsulfone was dispersed in 420 ml of water and 43.5 ml of 35% HCl was added at 0–5° C., followed by the addition of ice (100 g). Then, 67 ml of $NaNO_2$ was added to the reaction mixture for the purpose of diazolation, after which excess of nitrous acid was removed with the addition of sulfamic acid.

800 ml of $H_2O$ was added to 47.85 g (0.2 mol) of 7-amino-4-hydroxy-2-naphthalene sulfonic add and was then neutralized with 40 ml of aqueous solution of 5N LiOH, followed by the addition of 150 g of ice. Thereafter, 23.87 g (0.22 mol) of ethyl chloroformate was slowly added to the reaction mixture in the presence of aqueous solution of LiOH for adjusting pH to be 3–6, which leads to condensation reaction.

Then, the prepared diazo solution was added to the prepared ethyl chloroformate condensation solution and upon adjusting pH to be 5–6.5 with aqueous solution of NaOH, the coupling reaction was completed at 0–5° C. Finally, the resulting mixture was spray-dried and prepared reactive orange dye containing vinyl sulfone (R=$C_2H_5$, Z=$OSO_3Na$).

$^1$H-NMR(300 MHz, DMSO-$d_6$): δ 1.26(3H, t), 3.63(2H, t), 3.95(2H, t), 4.17(2H, q), 7.40(1H, s), 7.61(1H, d), 7.75 (1H, s), 7.88(2H, d), 7.92(2H, d), 8.15(1H, d), 10.24(1H, s), 15.56(1H, s)

EXAMPLE 4

First, 12.17 g(0.05 mol) of 4-aminophenyl-β-acetosaethylsulfone was dispersed in 125 ml of water and after the dropping of $NaNO_2$ (16.8 ml), the temperature was adjusted to 0–5° C., followed by the addition of ice (30 g). Then, 10.9 ml of 35% HCl was added to diazonate and excess of nitrous acid was removed with the addition of sulfamic acid.

150 ml of $H_2O$ was added to 11.96 g (0.05 mol) of 7-amino 4-hydroxy-2-naphthalene sulfonic acid and was then neutralized with 10 ml of aqueous solution of 5N LiOH, followed by the addition of 70 g of ice. Thereafter, 5.97 g (0.055 mol) of ethyl chloroformate was slowly added to the reaction mixture in the presence of aqueous solution of LiOH for adjusting pH to be 3–6, which leads to condensation reaction.

Thereafter, the diazo solution was added to the condensed solution of ethyl chloroformate and upon adjusting pH to be 5–6.5 with aqueous solution of NaOH, the coupling reaction was completed at 0–5° C. The resulting mixture was salting-outed and filtered, finally preparing reactive orange dye containing vinyl sulfone (R=$C_2H_5$, Z=$OCOCH_3$) expressed in the formula (1) was prepared.

$^1$H-NMR(300 MHz, DMSO-$d_6$): δ 1.26(3H, t), 1.77(3H, s), 3.71(2H, t), 4.17(2H, q), 4.26(2H, t), 7.40(1H, s), 7.61 (1H, d), 7.75(1H, d), 7.89(2H, d), 7.94(2H, d), 8.14(1H, d), 10.24(1H, s), 15.53(1H, s)

EXAMPLE 5–20

The reactive orange dye containing vinyl sulfones represented in the following Table 1a–1b were prepared as in Example 1–4.

TABLE 1a

| Category | Formula 2 R | | Reactive group | Tone |
|---|---|---|---|---|
| Example 5 | γ-acid* | $CH_3$ | p-$SO_2CH_2CH_2OSO_3Na$ | Redish orange |
| Example 6 | | $C_2H_5$ | m-$SO_2CH_2CH_2OSO_3Na$ | Redish orange |
| Example 7 | | $C_3H_7$ | p-$SO_2CH_2CH_2OSO_3Na$ | Redish orange |
| Example 8 | | n-$C_4H_9$ | p-$SO_2CH_2CH_2OSO_3Na$ | Redish orange |
| Example 9 | | $CH_3$ | p-$SO_2CH_2CH_2OSO_3CH_3$ | Redish orange |
| Example 10 | | $C_2H_5$ | m-$SO_2CH_2CH_2OSO_3CH_3$ | Redish orange |
| Example 11 | | $C_3H_7$ | p-$SO_2CH_2CH_2OSO_3CH_3$ | Redish orange |
| Example 12 | | n-$C_4H_9$ | p-$SO_2CH_2CH_2OSO_3CH_3$ | Redish orange |
| Example 13 | J-acid** | $CH_3$ | p-$SO_2CH_2CH_2OSO_3Na$ | Orange |
| Example 14 | | $C_2H_5$ | m-$SO_2CH_2CH_2OSO_3Na$ | Orange |
| Example 15 | | $C_3H_7$ | p-$SO_2CH_2CH_2OSO_3Na$ | Orange |
| Example 16 | | n-$C_4H_9$ | p-$SO_2CH_2CH_2OSO_3Na$ | Orange |

TABLE 1a-continued

| Category | Formula 2 R | | Reactive group | Tone |
|---|---|---|---|---|
| Example 17 | | $CH_3$ | p-$SO_2CH_2CH_2OSO_3CH_3$ | Orange |
| Example 18 | | $C_2H_5$ | m-$SO_2CH_2CH_2OSO_3CH_3$ | Orange |

TABLE 1b

| Category | Formula 2 R | | Reactive group | Tone |
|---|---|---|---|---|
| Example 19 | J-acid** | $C_3H_7$ | p-$SO_2CH_2CH_2OSO_3CH_3$ | Orange |
| Example 20 | | n-$C_4H_9$ | p-$SO_2CH_2CH_2OSO_3CH_3$ | Orange |

*γ-acid: 6-amino-4-hydroxy-2-naphthalenesulfone acid
**J-acid: 7-amoino-4-hydroxy-2-naphthalenesulfone acid

EXAMPLE 14

$^1$H-NMR(300 MHz, DMSO-$d_6$): δ 1.26(3H, t), 3.66(2H, t), 3.98(2H, t), 4.18(2H, q), 7.33(1H, s), 7.47–7.68(2H, m), 7.65(1H, s), 7.74(1H, s), 8.19(1H, d), 8.21–8.68(2H, m), 10.06(1H, s)

EXAMPLE 18

$^1$H-NMR(300 MHz, DMSO-$d_6$): δ 1.26(3H, t), 1.75(3H, s), 3.77(2H, t), 4.18(2H, q), 4.29(2H, t), 7.39(1H, s), 7.63 (1H, t), 7.68(1H, d), 7.71(1H, d), 7.76(1H, s), 8.16(1H, d), 8.18(1H, d), 8.19(1H, s), 10.23(1H, s), 15.69(1H, s)

Test 0.02 g (1.0% o.w.f. dyeing), 0.04 g (2.0% o.w.f. dyeing) and 0.06 g (3.0% o.w.f. dyeing) of the orange reactive dye prepared in the above was dissolved in 25 ml of water, respectively and then 2 g of cotton was added, followed by elevating temperature to 40° C. Then, 0.75 g of sodium sulfate was added and the temperature is elevated to 60° C., followed by the addition of 0.75 g of sodium carbonate. Dyeing is carried for 60 minutes and washed with cold water. The fabric is soaped off at 98° C. for 20 minutes, is rinsed once more and is dried. The dyeing yield and several fastness of the resulting dyed fabric were measured.

In terms of dyeing yield, 1.0% o.w.f. dyeing shows 80–82% and 3.0% o.w.f. dyeing 82–84%, which is higher than monofunctional dye.

With respect to light fastness (KS K 0218 direct-illumination method), 1.0% o.w.f. dyeing shows 3–4th grade and 3.0% o.w.f. dyeing 4–5th grade.

Referring to the fastness on washing (KS K 030 A-4), perspiration (Acidity, Alkalinity; AATCC Method 14) and chlorine (JIS-0884-1983), this invention exhibits all 5th grade, which is excellent values.

Further, this invention shows excellent levelness of dyeing and reproducibility.

As described in the above, the reactive orange dye containing vinyl sulfone expressed in formula 1 shows excellent levelness of dyeing and reproducibility as well as several fastness, which is well applicable to dyeing of cellulose fabrics.

What is claimed is:

1. A reactive orange dye containing vinyl sulfone expressed in the following formula 1:

Formula 1

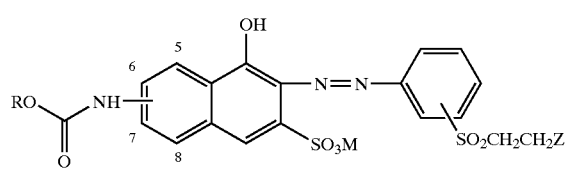

wherein, M is alkaline metal atom; Z is —O—SO$_3$M or OC(O)CH$_3$; R is alkyl group having 1–4 of carbon atom; and a position of C$_6$ or C$_7$ is substituted with carbamate group.

2. A process for preparing a reactive orange dye containing vinyl sulfone expressed in the following formula 1, which comprises the steps of:

(a) diazotizing aminophenyl-β-ethylsulfone compound of formula 2;

(b) condensing in such a manner that alkyl chloroformate is slowly added to neutralized solution of 6(7)-amino-4-hydroxy-2-naphthalenesulfonic acid to prepare 6(7)-alkoxycarbonylamino-4-hydroxy-2-naphthalene-sulfonic acid expressed in the following formula (3) at 0–25° C. with maintaining pH in the range of 3–6 by means of LiOH or Li$_2$CO$_3$; and (c) coupling the reacting mixtures obtained in the above steps of (a) and (b) at 0–5° C. with adding a base so as to adjust pH lower than 6.5, Formula 2

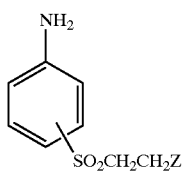

Formula 3

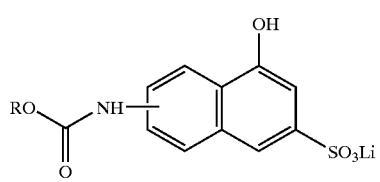

Formula 1

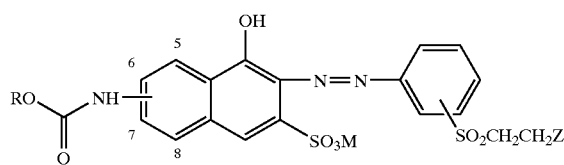

wherein, M is alkaline metal atom; Z is —O—SO$_3$M or OC(O)CH$_3$; R is alkyl group having 1–4 of carbon atom; and a position of C$_6$ or C$_7$ is substituted with carbamate group.

* * * * *